United States Patent

Marckx et al.

[15] 3,638,521
[45] Feb. 1, 1972

[54] METHOD AND APPARATUS FOR SLICING BREAD AND OTHER BAKERY PRODUCTS

[72] Inventors: Edward I. Marckx, Portland; Harvey F. Stines, Gresham, both of Oreg.

[73] Assignee: Stinemark Corporation, Gresham, Oreg.

[22] Filed: Nov. 5, 1970

[21] Appl. No.: 87,255

Related U.S. Application Data

[63] Continuation-in-part of Ser. No. 836,485, June 25, 1969, abandoned, which is a continuation-in-part of Ser. No. 681,870, Nov. 9, 1967, abandoned.

[52] U.S. Cl..................................83/22, 83/168, 83/169, 83/171, 83/201.12
[51] Int. Cl..........................................B26d 7/08
[58] Field of Search..................83/22, 168, 169, 170, 171, 83/201, 201.03, 201.08, 201.12

[56] References Cited

UNITED STATES PATENTS

| | | | |
|---|---|---|---|
| 1,916,596 | 7/1933 | Winfree, Jr. | 83/168 |
| 3,022,694 | 2/1962 | Nuss | 83/169 |
| 1,944,577 | 1/1934 | Rose | 83/169 |
| 2,311,761 | 2/1943 | Kottmann et al. | 83/168 |
| 2,498,615 | 2/1950 | Copenhaver | 83/169 |
| 2,112,443 | 3/1938 | Martoccio | 83/169 X |

Primary Examiner—Andrew R. Juhasz
Assistant Examiner—James F. Coan
Attorney—Eugene D. Farley

[57] ABSTRACT

Raisin bread, fruit cake, and other sugary bakery products are sliced by applying a film of moisture continuously to a slicing blade and traversing the products and the blade relative to each other in a cutting path. The moisture film may be applied by subjecting the blade to an aqueous mist or by directing against the blade a spray of steam. In the latter case, a sufficient temperature differential is maintained between the blade and steam to cause the steam to condense on the blade, thereby producing the desired moisture film.

Additionally, a lubricating and cleansing oil film may be applied by subjecting the blade to a mist of an edible oil suspended in a gaseous vehicle therefor.

8 Claims, 4 Drawing Figures

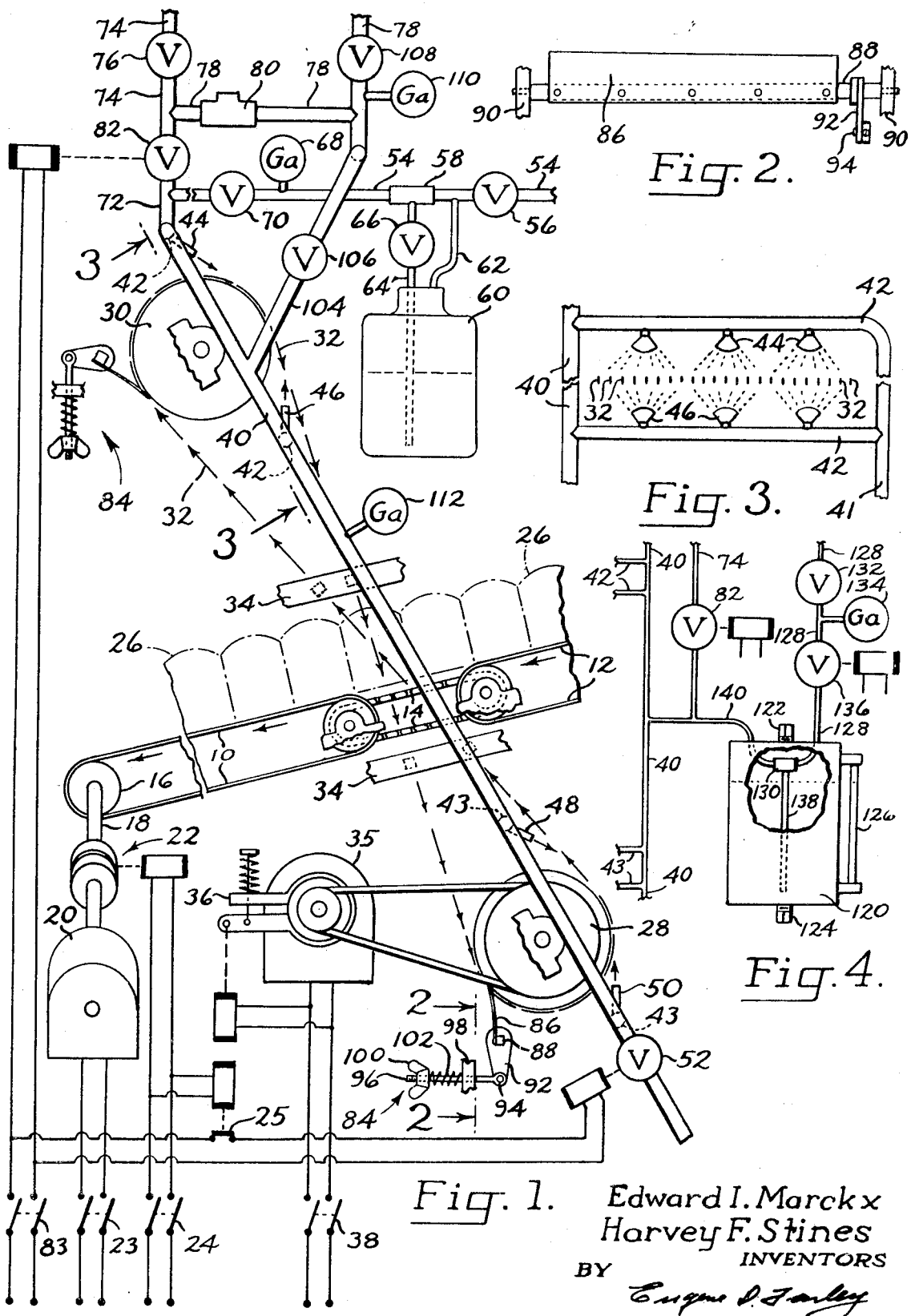

METHOD AND APPARATUS FOR SLICING BREAD AND OTHER BAKERY PRODUCTS

This application is a continuation in part of the patent application of Edward I. Marckx and Harvey F. Stines, Ser. No. 836,485, filed June 25, 1969 for Method and Apparatus for Slicing Bread and Other Bakery Products, now abandoned the same being a continuation-in-part of the patent application of Edward I. Marckx and Harvey F. Stines, Ser. No. 681,870, filed Nov. 9, 1967 for Method and Apparatus for Slicing Bread and Other Bakery Products, now abandoned.

This invention relates to method and apparatus for slicing products such as raisin bread, fruit cake, coffee cake, soft white bread, hot bread and other bakery products which normally are difficult to slice because of temperature effects, softness, or a content of sugar, fruit, or other sticky ingredients.

The slicing of certain bakery products such as raisin bread and very soft breads presents a serious problem in commercial bakeries. When conventional band slicers are employed, the bread is crushed in the slicer. Also, the blades soon fill with a sugary deposit. This causes them to gum up so that not only do they cut ineffectively, but they also tear the products. It also may stop the slicer.

Various expedients heretofore have been tried in an effort to overcome this problem.

Reciprocating slicers have been employed. This reduces the slicing rate severely, cuts down the production of the bakery, requires product rehandling, adds to the cost, and does not result in entirely satisfactory slicing.

The blades and drums of the slicer have been sponged off periodically with water. This results in an erratic situation in which at one moment the blades are starved for water so that they gum up and tear the product, while at the next moment they are surfeited with water so that they convert the product to dough.

Still further, it has been attempted to overcome the problem by using blades of extra Keenness. This is only partially effective, and adds materially to the cost because of the initial higher cost of the blades and the cost attendant upon continuously maintaining them razor sharp.

It accordingly is the general object of the present invention to provide method and apparatus for slicing sugary bakery products which method and apparatus make possible the slicing of such products at a high rate of speed and with a high degree of efficiency. Other benefits accruing from the application of the herein described method and apparatus are substantially lowered product cost substantially improved product quality, substantially lengthened service life of the slicing equipment, substantially lower maintenance costs and substantially universal application to diverse types of bakery products.

The manner in which the foregoing and other objects of this invention are accomplished are illustrated in the accompanying specification and claims, considered together with the drawings, wherein:

FIG. 1 is a schematic view in side elevation of the herein described apparatus for slicing bakery products;

FIG. 2 is a detail view in elevation of a scraper unit employed in conjunction with the herein described slicing apparatus, looking in the direction of the arrows of line 2—2 of FIG. 1;

FIG. 3 is a detail view in elevation of a cleaning jet unit employed in the herein described slicing apparatus, looking in the direction of line 3—3 of FIG. 1; and FIG. 4 is a schematic view in elevation of the herein described apparatus in an alternate embodiment.

As shown particularly in FIG. 1, the slicing apparatus of our invention is adapted for use in conjunction with a conveyor employed for traversing bakery problem products with respect to a conventional band-type slicer.

The conveyor includes aligned, longitudinally spaced first endless belts 10, 12 interconnected and driven synchronously by means of a chain and sprocket drive assembly 14.

Endless belt 10 is reeved about a pulley 16 keyed to a shaft 18. Shaft 18 is driven in the desired feed direction by an electric motor 20 working through a solenoid-operated clutch 22. The motor is in an electric circuit with a switch 23 by means of which it may be stopped and started. The clutch is in an electric circuit with a control switch 24 which operates not only the clutch, but also a solenoid-operated switch 25, the purpose of which will appear hereinafter.

The conventional band slicer cooperating with the conveyor in slicing loaves of bread 26 conveyed on the latter includes a driven drum 28 and, spaced therefrom, an axially aligned idler drum 30. The two drums mount a plurality of slicing blades 32. These lie in parallel, laterally spaced arrangement in the manner shown in FIG. 3. They lie flat on the drums, but by means of guides 34 are turned 90° so that during their cutting intervals their planes lie parallel to the path of travel of bread loaves 26.

The cutter assembly is driven by means of an electric motor 35. A spring-pressed, solenoid-operated brake 36 engages the rotor of the motor. Both the motor and the solenoid of the brake are in parallel in an electric circuit including switch 38. The brake is so constructed that it normally is applied by its spring component.

However, when switch 38 is closed, the solenoid releases the brake, permitting the motor to operate. When the circuit is broken, the brake is applied instantly. This prevents coasting of the motor, and of the slicer to which it is connected, and prevents fouling of the slicer blades.

Our invention provides an operating unit which, in combination with the above-described conveyor and slicer, affords means for cleaning the blades of the slicer as required to enable them to slice sugary bakery products efficiently, without tearing the product, without converting them to dough, and without dissolving their sugar content excessively.

To this end, a grid of conduits surrounds the cutting blades and mounts jets for applying a film of moisture to the blades. The conduit grid, shown particularly in FIGS. 1 and 3, includes a main conduit 40 and a shunt conduit 41 which extend the length of the cutting unit, closely adjacent blades 32. Two pairs of conduits 42, 42 and 43, 43 interconnect conduits 40, 41. These are arranged in parallel with their opposed component conduits on opposite sides of the bank of cutters 32.

Each of the parallel conduits mounts oppositely directed spray heads. Thus spray heads 44, 46 of conduits 42 are closely adjacent and impinge upon opposite sides of the blades and upon drum 30. The spray heads 48, 50 of conduits 43 likewise impinge upon opposite sides of cutters 32. However, they also impinge upon the peripheral surface of driving drum 28, which they thus clean contemporaneously with the cutters.

The downstream end of main conduit 40 communicates through a normally closed, solenoid-operated valve 52 with a water condensate accumulating tank. At its upstream end it communicates with one of two systems for supplying moisture to the spray heads. For purposes of convenience in description, these two systems are shown together in FIG. 1. However, it is our intent that they be used independently of each other and in the alternative, since both serve similar functions.

In the one system, a mist of water vapor is prepared and jetted against the cutter blades by means of the sprays.

In this alternative, air under pressure is introduced into a conduit 54. It passes through control valve 56 into atomizer 58. The latter is supplied with water from a reservoir 60 having an air pressure line 62 communicating with line 54 downstream from valve 56, and with a water supply line 64 connecting through valve 66 with atomizer 58 and supplying the same.

The atomizer 58 may be any one of several conventional types, such as that sold under the brand name of "Mistolator." It manufactures and supplies a fine mist of water entrained in compressed air.

The reservoir may contain, in addition to water, a suitable amount of a suitable edible emulsifier, added to stabilize the mist.

The mist continues down line 54 past pressure gauge 68, and through control valve 70 into a feed line 72 which communicates with, and feeds, main conduit 40, above described. Thence it travels down the conduit grid and out through spray heads 44, 46, 48 and 50. It thereby is directed against cutter blades 32, keeping them moist during their operation.

The alternative and preferred system for keeping the blades moist and clean during their operation makes use of condensed steam.

Steam under a pressure of from 5–25-pounds gauge (saturated steam pressure), supplied from a boiler of suitable construction, passes through line 74 to control valve 76. A bypass line 78 communicates with line 74 just downstream from valve 76. It contains a standard impulse-operated trap valve 80 of the class which open when subjected to steam containing condensed moisture. Steam passing through valve 80 continues along line 78 to the condensate tank, where it joins any condensate exhausting from the spray system via valve 52.

Steam conduit 74 communicates with conduit 72 through a normally closed solenoid-operated valve 82. Steam under a pressure of from 1 to 400, preferably 1 to 50, p.s.i.g. (saturated steam pressure) thus is made available to the spray grid system and to all of the spray heads. The exact steam pressure employed will be determined by such factors as the type of spray heads used, their distance from the blades, and the nature of the product being sliced. In any event, the steam is used at a pressure and under conditions such that at the usual ambient temperatures the cutter blades are cooled by the air sufficiently to condense or collect the steam which impinges upon them. This deposits on the blades a film of moisture in amount sufficient to serve the desired cleaning function, but insufficient to turn the bakery products to dough, or to dissolve their sugar coatings.

Further to increase the cleaning efficiency of the unit, there are provided one or two scraper blade assemblies. These are indicated generally at 84 and are shown in detail in FIG. 2. Each assembly includes a blade 86 which may be made of resilient spring steel. It is riveted or otherwise secured to a shaft 88 having a square central section and ends journaled in bearings 90.

One end of a lever 92 is fixed to shaft 88. The other end of the lever is connected by means of a pivot pin 94 to a tensioning rod 96. The latter extends slidably through a guide 98. Its outer end is threaded for the reception of a wingnut 100. A spring 102 is interposed between the wing nut and frame member 98. Hence by tightening down on wingnut 100, lever 92 acts to increase the tension under which scraper blade 86 operates.

Means also are provided for insuring that the steam applied to the slicer blades has an adequate supply of condensed moisture. Under certain circumstances a moisture deficiency may be present. Such a circumstance is present in hot climates where the bakery room temperature is unusually high. It also is present in hot industrial environments, as where the bakery room is adjacent the boiler room. Additional moisture then may be required to maintain the moisture content of the steam at the level necessary for efficient cleaning of the slicer blades.

Another circumstances requiring maintenance of a high level of moisture in the steam supply is that present when certain bakery products having a high content of sugar, fruit or other ingredients are processed.

This problem is overcome in the present system by making use of the condensed moisture discharged through bypass line 78.

Such moisture normally passes to the condensate tank. However, it may be used to advantage in charging a predetermined amount of free moisture to the steam passing via lines 40, 42 to spray heads 44, 46.

This is accomplished by interconnecting bypass line 78 and main conduit 40 with a connecting line 104. A needle valve 106 is included in this line.

A throttle valve 108 and gauge 110 are inserted in line 78 downstream from the point of connection of line 104. Another gauge 112 is inserted in line 40 downstream from the point of connection of the same line.

The need for additional moisture in the steam fed to the sprays may be observed visually by noting solids buildup on the slicer blades and associated drums.

When this need exists, valves 106 and 108 are adjusted so that a slight pressure differential exists in favor of the passage of a controlled amount of condensate through line 104 into main line 40. This may be accomplished, for example, by cracking open valve 106 and closing down valve 108 until gauge 112 records an operating pressure of from 2–5 pounds of steam while gauge 110 records a pressure of about 1 pound more.

A running adjustment of the valves thus may be made by the baker as required to maintain the desired and optimum moisture content in the steam.

The manner of operating of the above-described apparatus for slicing sugary and other problem bakery products is as follows:

Loaves of bread 26 are placed on conveyor 12, which is arranged to feed them into cutting contact with the blades 32 of the rotary band slicer.

To initiate the sequence using air mist as a cleaning agent, conveyor units 10, 12 are put in operation. Compressed air control valves 52, 56 and 70 are adjusted manually in a nonillustrated but self evident manner. This supplies air under pressure to atomizer 58 and reservoir 60.

As a consequence, mist having a composition determined by the setting of valve 66 is passed along line 54, past gauge 68, through metering valve 70, into conduit 72. From there it passes down main conduit 40, down branch conduit 41, and through the two spray grid systems. Sprays of water-containing mist thereupon are directed against opposite sides of blades 32 as well as against the surfaces of drums 28, 30. This cleans both the blades and the drums.

To initiate the alternate, preferred sequence employing steam, valve 76 is opened while valve 82 remains closed. As a result, steam at a pressure of from 1–400 p.s.i.g. (saturated steam pressure), passes through valve 76 into bypass line 78 and through a conventional condensate-triggered impulse trap 80. The line thus is blown until it is free from all condensate, which passes to the condensate tank. This insures that free water will not be present to gum up the products.

After the line has been fully blown, switch 23 is closed, starting conveyor drive motor 20. Starting of the motor does not start the conveyor, however, since clutch 22 normally is open.

Next, switch 38 is closed. This energizes blade drive motor 35 and release brake 36, driving slicer blades 32.

After the drive motor for the blades has been started, switch 83 is closed. This opens solenoid-operated steam control valves 52 and 82 and permits steam to flow through main line 40 and out through discharge valve 52. Very little steam flows through the spray heads, however, because the steam is at low pressure and the path of least resistance is through line 40.

When the baker is ready to slice the bread, he closes switch 24. This engages clutch 22 and starts the conveyor drive. It also closes valve 52 and forces all the steam through the spray heads, where it cleans both blades and the drums of the slicer. Conversely, when the baker opens switch 24, the conveyor drive is stopped, valve 52 opened, and the flow of steam through the spray heads stopped so that it will not damage loaves engaging the blades when the conveyor is shut down.

As occasion requires, the baker may adjust the relative settings of valves 106, 108 to cause a predetermined amount of condensate to flow through connecting line 104 into main line 40, thereby fortifying the amount of the moisture content of the steam fed to the spray heads and correcting for difficult situations.

Maintaining the blades and drums clean in this manner permits rapid slicing of the bread or other product as it is carried along on conveyors 10, 12. Any sugary residue collecting on the blades immediately is washed off. Any sugary or gummy deposit collecting on drive roll 28 likewise is dissolved and washed off. In addition, scraper blade assemblies 84 assist in removing any accumulating residues. As a result, the bakery products may be sliced efficiently at a rate several times that heretofore possible, without significant damage caused either by tearing, or conversion of the bread to dough.

The apparatus illustrated in FIG. 4 is of particular value in processing bakery products which are especially difficult to slice. Such products include, for example, soft white breads and hot breads, i.e., breads warm from the ovens and still at a temperature of about 130° F. In fact, the apparatus of FIG. 4 provides the first practical means for slicing bakery products of this class on the large commercial scale.

The FIG. 4 apparatus has for its general function the application to the slicing blades of a mist of an edible oil suspended in a gaseous vehicle therefor. This may be used separately or in conjunction with the water mist. It applies a lubricating and cleansing film of oil to the blades.

The apparatus includes an oil mist generator which disperses a preselected oil in an entraining gaseous vehicle such as air or high-pressure steam. Although various types of mist generating apparatus may be employed for this purpose, a suitable one is that illustrated schematically in the drawings and sold by the Alemite Division of Stewart-Warner Corporation under the general designation "Mist Generating Head" (Alemite Bulletin SER 383802: Rev. 4–67).

The mist-generating head includes a closed receptacle 120 having a fill lug 122 at its upper end, a drain plug 124 at its lower end, and a level indicating glass 126 along one side.

A pressure conduit 128 is connected to a source of gas under pressure at one end and communicates at the other end with an atomizing or mist-forming device 130 contained within the receptacle. This conduit includes in series relation an on-off master control valve 132, a pressure-indicating gauge 134 and a normally closed, solenoid-operated valve 136. On-off valve 132 compares in its general function with valve 76 of the embodiment of FIGS. 1–3, while solenoid-operated valve 136 corresponds in structure and function to valve 82 of those figures.

A suction pipe 138 feeds atomizing element 130 with oil contained in the receptacle. The mist which is generated is discharged from the device via conduit 140 which communicates with main steam line 74 downstream from solenoid-operated valve 82. As noted above, the latter line in turn feeds the grid including sprays 44, 46, 48 and 50.

In the alternative, line 140 may communicate directly with line 40 supplying the grids, if this is more convenient or desirable for a special purpose.

A variety of oils and oily materials may be converted to a mist by the apparatus above described and applied to blades 32 of the slicer. Such oils may be of either animal, vegetable, or mineral origin, provided they are "edible" in the sense that they are nontoxic and compatible with bakery products. They are used advantageously since they have the special property of clinging to the metal of the slicer blades.

Thus a bread-release pan oil of vegetable origin may be employed. This comprises the oil which the baker applies to the pans for easy release of the bread. Suitable vegetable oils are cottonseed oil, soy bean oil, corn oil, peanut oil, and coconut oil.

Similarly, a divider oil of mineral origin may be employed. This comprises the oil which the baker applies to the dough when dividing it into pieces.

A typical example is a U.S.P. light mineral oil, preferably white in color to avoid discoloration of the bread.

A mixture of vegetable and mineral oils also maybe used, for example a mixture containing 20 to 60 percent by volume of U.S.P. light mineral oil and the balance commercial soy bean oil.

Where the oil is to be used in the production of an oil mist to be used in combination with steam, the performance of the combination may be improved by the inclusion of a small proportion of an edible emulsifying agent such as hydroxylated lecithin. This material is used in an emulsifying quantity, e.g., from 0.1 to 5 ounces per quart of oil. Its presence promotes mixing of the oil mist and steam, thinning down the oil and improving the slicing action of the slicer particularly on soft breads. It also further prevents discoloration of the bread.

In the operation of the unit, mast valve 132 first is opened. This introduces compressed air, high-pressure steam or other selected gas to conduit 128 at a pressure measured by gauge 134.

Next, at the proper moment in the slicing sequence, solenoid-operated control valve 136 is opened. This admits the gas to aspirating unit 130 in a flow determined by the setting of the valve. This flow in turn controls the amount of oil which is picked up by the aspirator.

The mist generated in this manner passes through line 140 into line 74 and thence via line 40 into the spray grid. The amount of oil applied to the blades by the spray is variable, depending upon the product and other operating conditions. In general, however, a sufficient quantity is supplied to deposit a lubricating and cleansing oil film on the blades. In the operation of a conventional bakery band slicer of average size, slicing soft white bread, the oil use is of the order of 1 quart of oil in 15 hours of operation.

The capacity to deposit a film of water and/or a film of oil on the slicing blades lends a special versatility and operating value to the slicer. The water film prevents the sticking of sugary products to the blades. The oil film prevents the adhesion of protein and gluten to the blades. The two systems thus may be used separately or in conjunction with each other. With certain sugary products, it may be desirable to apply a water film only. In the case of very soft breads or hot breads, it may be desirable to apply the oil film only. With certain products where both types of sticking problems are encountered, the two systems may be run concurrently whereupon the action of one reinforces the action of the other so that high capacity, efficient operation of the slicer is obtained.

Having thus described our invention, we claim:

1. The method of slicing a bakery product which comprises:
   a. traversing the product and a slicing blade relative to each other,
   b. applying steam to the blade while maintaining the blade at a temperature sufficiently cool to condense the steam and deposit a film of moisture on the blade,
   c. supplying free water in predetermined amount to the steam applied to the blade, thereby building up on the blade a moisture film sufficient to maintain the blade clean of bakery product during slicing, but insufficient to reduce the bakery product to dough during slicing, and
   d. cutting through the bakery product while maintaining said moisture film on the slicing blade.

2. The method of claim 1, wherein the step of supplying free water comprises collecting steam condensed during the slicing operation and supplying the collected condensate in predetermined amount to the steam applied to the blade, thereby maintaining its content of moisture within predetermined limits.

3. Apparatus for slicing a bakery product which comprises:
   a. a slicing blade and means for driving the same,
   b. moisture-applying means arranged for applying a film of moisture on the blade sufficient to maintain the blade clean of bakery product during slicing, but insufficient to reduce a substantial amount of the bakery product to dough during slicing,
   c. conveyor means mounting the product and conveying it past the slicing blade,
   d. conveyor drive means connected to the conveyor means, and
   e. control means arranged for starting and stopping the moisture-applying means in unison with the conveyor means,
   f. the control means comprising an electric circuit and in the electric circuit solenoid-operated clutch means connected to the conveyor drive means, solenoid-operated valve means operative to start and stop the moisture-applying means, and electric switch means operative to alter the clutch means and valve means for starting and stopping in unison the moisture-applying means and the conveyor means.

4. The method of slicing sugary bakery products which comprises;
   a. traversing the products and a moving slicing blade relative to each other,
   b. continuously applying steam to the moving blade while maintaining the blade at a temperature sufficiently cool to condense the steam and deposit a film of moisture on the blade sufficient to maintain the blade clean of bakery product during slicing but insufficient to reduce the bakery product to dough during slicing, and
   c. cutting through the bakery products while maintaining said moisture film on the slicing blade.

5. The method of claim 1 including the step of applying to the moving blade concurrently with the application of steam a mist of an edible oil suspended in a gaseous vehicle therefor, thereby depositing a lubricating and cleansing film of oil on the blade.

6. Apparatus for slicing a bakery product which comprises:
   a. a slicing blade and means for driving the same,
   b. moisture-applying means arranged for applying a film of moisture on the blade sufficient to maintain the blade clean of bakery product during slicing, but insufficient to reduce a substantial amount of the bakery product to dough during slicing,
   c. the moisture-applying means comprising steam spray means arranged for applying steam continuously to the moving blade at a temperature predetermined to cause condensation of the steam on the blade with resultant deposition of a blade-cleansing moisture film thereon,
   d. means for introducing into the steam free water in amount predetermined to maintain the free moisture content of the steam at a predetermined level, and
   e. drive means arranged for driving the bakery product and the slicing blade relative to each other in a slicing traverse.

7. Apparatus for slicing a bakery product which comprises
   a. a slicing blade and means for driving the same,
   b. moisture-applying means arranged for applying a film of moisture on the blade sufficient to maintain the blade clean of bakery product during slicing, but insufficient to reduce a substantial amount of the bakery product to dough during slicing,
   c. the moisture-applying means comprising steam spray means arranged for applying steam continuously to the moving blade at a temperature predetermined to cause condensation of the steam on the blade with resultant deposition of a blade-cleansing moisture film thereon,
   d. means for trapping condensed steam from the steam spray means and recycling to the spray means the predetermined amount of the condensate for maintaining in the steam a free moisture content of predetermined amount, and
   e. drive means arranged for driving the bakery product and the slicing blade relative to each other in a slicing traverse.

8. The apparatus of claim 6 including oil-mist-applying means arranged for generating a mist of an edible oil suspended in a gaseous vehicle therefor and applying the mist to the blade concurrently with the steam spray, thereby depositing on the blade a lubricating and cleansing film of oil.

* * * * *